Figure 3:
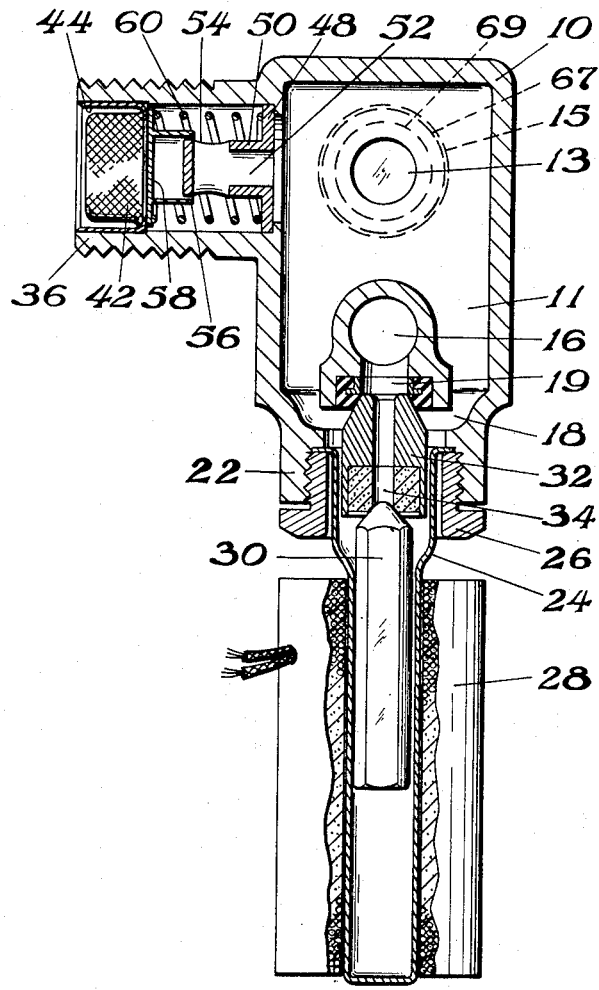

Dec. 28, 1954   C. D. BRANSON   2,698,029
CONSTANT FLOW HOT AND COLD WATER BLENDING VALVE
Filed July 7, 1950   2 Sheets-Sheet 1
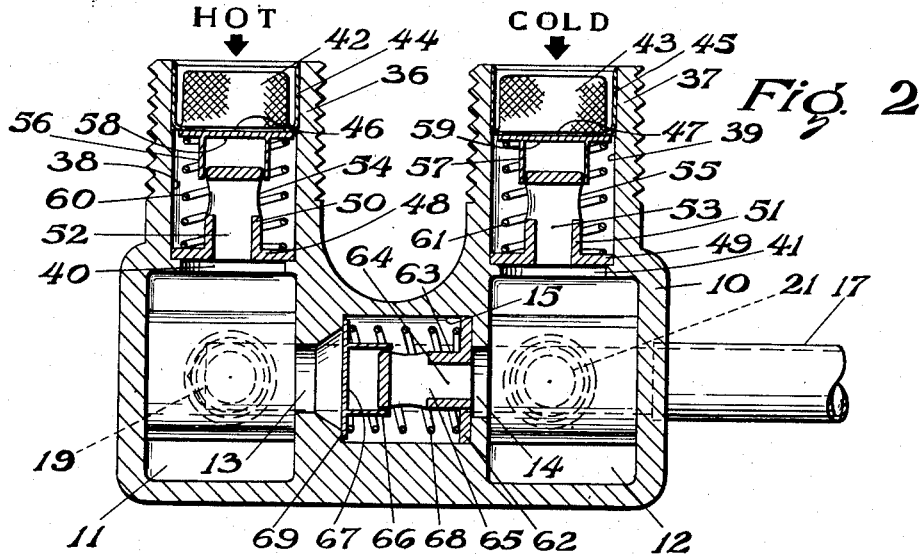
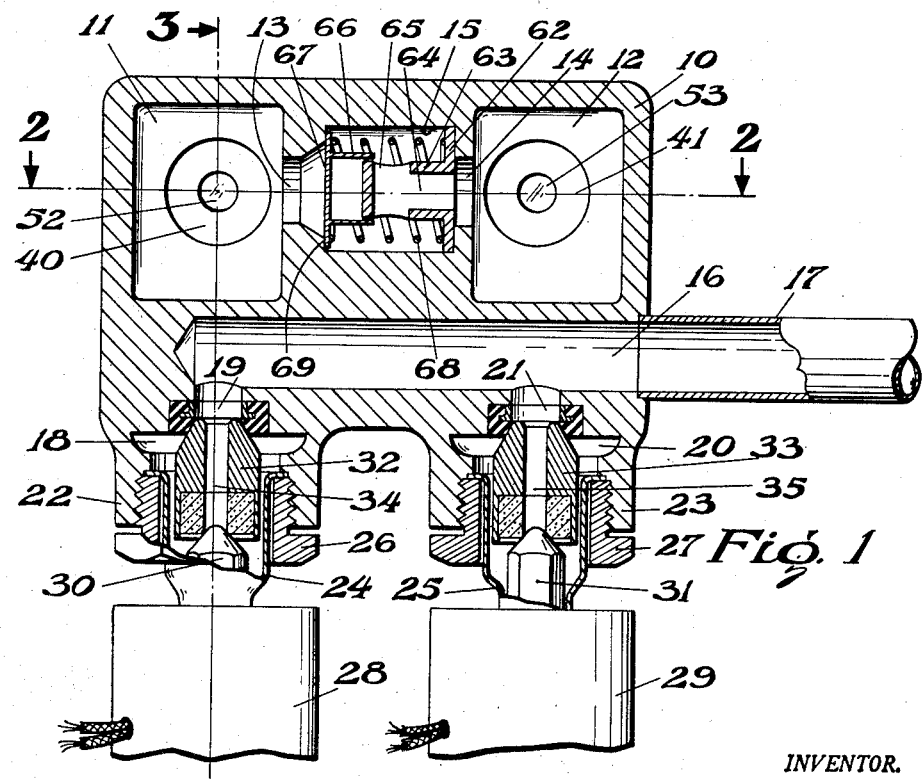
INVENTOR.
CHARLES D. BRANSON
BY
*Albert J. Henderson*
ATTORNEY

INVENTOR.
CHARLES D. BRANSON
BY
ATTORNEY

United States Patent Office 2,698,029
Patented Dec. 28, 1954

2,698,029
CONSTANT FLOW HOT AND COLD WATER BLENDING VALVE

Charles D. Branson, Knoxville, Tenn., assignor to Robertshaw-Fulton Controls Company, Greensburg, Pa., a corporation of Delaware Application July 7, 1950, Serial No. 172,577

4 Claims. (Cl. 137—599)

This invention relates to constant flow hot and cold water blending valves and more particularly to such valves to which are delivered constant volumes of hot and cold water and which deliver constant volumes of hot water or of mixed hot and cold waters at predetermined constant temperatures.

Heretofore various hot and cold water blending valves have been proposed in which the volumes of hot and cold water mixed in the valve are controlled by thermostatic means so that the temperature of the mixed water is maintained at a predetermined constant. Most of these valves function in an acceptable manner but are costly due to the cost of the thermostatic device necessary for the proper functioning of the valve.

I have found that if constant volumes of hot water and constant volumes of cold water are admitted to a mixing valve and if the temperatures of the hot and cold waters are maintained relatively constant, as they usually are in most domestic installations, that the mixed water delivered by the valve will be maintained at approximately constant temperature and that this temperature can be regulated by a simple adjustment of the mechanisms controlling the volumes of hot or cold water admitted to the valve. Such a structure does not require a thermostatic device for controlling the volumes of hot and cold waters and can be constructed in a simple manner at relatively low cost.

Constant flow hot and cold water blending valves of the type to which the present invention pertains are normally used in domestic installations with equipment requiring constant volumes of hot water or of mixed water at constant temperature and such valves find particular use in modern automatic domestic washing machines.

It is accordingly an object of the present invention to provide a novel constant flow hot and cold water blending valve which will deliver constant volumes of hot water or constant volumes of mixed hot and cold water at a relatively constant temperature without employing a thermostatic element to control mixed water temperatures.

Another object is to provide such a valve in which constant volumes of hot water and constant volumes of cold water are admitted to the valve to deliver constant volumes of hot water or of mixed water to the utilizing instrumentality in which the temperature of the mixed water is controlled by adjustment of either the hot or the cold water constant flow control device.

Another object is to provide such a valve in which solenoid actuated valves are controlled in the timed cycle of the utilizing instrumentality to withdraw constant volumes of hot water from the valve or to withdraw constant volumes of mixed water at constant temperature from the valve.

Another object is to provide such a novel valve having constant flow devices in the hot and cold water supply inlets thereof and having a constant flow device admitting hot water to the cold water side of the valve to provide mixed water at constant temperatures, the constant flow control device between the hot and cold water sides of the valve acting as check valve to prevent cold water flow to the hot water side of the valve.

Another object is to provide such a valve which is of simple construction and which is economical to manufacture and of positive and certain operation.

Other and further objects of the present invention will appear from the following description.

The constant flow hot and cold water blending valve of the present invention is capable of various mechanical embodiments one of which is shown in the accompanying drawings and is described hereinafter for purposes of illustration. This illustrative embodiment of my invention should in no way be construed as defining or limiting the same and reference should be had to the appended claims to determine the scope of my invention.

In the accompanying drawings,

Fig. 1 is a sectional view through an illustrative embodiment of the constant flow hot and cold water blending valve of my invention showing the solenoid actuated valves for admitting either hot water or mixed hot and cold waters to the discharge port of the valve and showing the relative position of the hot and cold water inlet chambers and the connecting constant flow and check valve device therebetween;

Fig. 2 is a sectional view on the line 2—2 of Fig. 1 showing the hot and cold water inlets for the mixing valve, the constant flow devices positioned therein, the relative position of the hot and cold water chambers in the valve structure and the constant flow and check valve device connecting the hot and cold water chambers; and Fig. 3 is a cross-sectional view on the line 3—3 of Fig. 1 showing the arrangement of the discharge port of the valve with respect to the hot water chamber and the position of the constant flow device in the hot water inlet.

Referring now to the several figures, 10 is any suitable valve housing formed in any desired shape and of any suitable material, preferably of cast metal. Housing 10 is provided with a hot water inlet chamber 11 and a cold water inlet chamber 12 which are interconnected through ports 13 and 14 and intermediate chamber 15. Housing 10 is also provided with discharge chamber or port 16 to which may be secured extension 17 leading to the using instrumentality.

Hot water chamber 11 communicates with discharge port 16 through an intermediate chamber 18 and an interconnecting port 19. Cold water chamber 12 connects to discharge port 16 through intermediate chamber 20 and an interconnecting port 21.

Housing 10 is provided with a pair of nipples 22 and 23 which are internally threaded to receive a pair of suitable solenoid actuated valve structures. The solenoid actuated valve structures here disclosed are the same as those described in my copending application Serial No. 31,521, filed June 7, 1948, since abandoned, and are actuated and operate in the same manner as therein disclosed. As shown in the present application, these solenoid actuated valve structures comprise tubular members 24 and 25 which are held respectively within nipples 22 and 23 by suitable gland nuts 26 and 27 respectively. Suitable coils 28 and 29 surround tubular members 24 and 25 respectively and are energized during the cycle of the utilizing instrumentality in appropriate and timed sequence. Solenoid valve elements 30 and 31 are mounted for reciprocation within tubular members 24 and 25 respectively and are moved by the energization of coils 28 and 29 respectively. Valve members 32 and 33 are mounted for reciprocation within chamber 18 and tubular member 24 and chamber 20 and tubular member 25, respectively, and close ports 19 and 21 respectively. Valve element 32 is axially bored at 34 and valve element 33 is axially bored at 35, bores 34 and 35 being closed respectively by solenoid elements 30 and 31.

Both of these solenoid actuated valves operate on the unbalanced fluid pressure principle and when solenoid elements 30 and 31 close bores 34 and 35 the fluid in chambers 18 and 20 leaks past valve elements 32 and 33 and sets up pressures on the surfaces thereof which forces elements 32 and 33 into ports 19 and 21 to close the same. When solenoid elements 30 and 31 are withdrawn by energizing solenoids 28 and 29 pressures acting on elements 32 and 33 will be unbalanced by bleeding through bores 34 and 35 and the unbalanced pressures acting on elements 32 and 33 will unseat them and open ports 19 and 21, all in known manner.

Housing 10 is provided with a pair of hot and cold water inlet nipples 36 and 37 which may be externally threaded to receive suitable hot and cold water connections. Nipples 36 and 37 are axially bored to provide internal chambers 38 and 39 respectively and chambers 38 and 39 discharge into hot and cold water chambers 11 and 12 through ports 40 and 41 respectively. Suitable screens 42 and 43 may be placed in the inlet of nipples 36 and 37 respectively. Screens 42 and 43 may be mounted within cup-shaped members 44 and 45 respectively and cup-shaped members 44 and 45 are provided with axial ports 46 and 47.

Suitable constant flow control devices are mounted within chambers 38 and 39 and these constant flow control devices as shown are similar to those described in my copending application Serial No. 21,799, filed April 19, 1948, now Patent No. 2,584,418, issued February 5, 1952. As shown in the present application, these constant flow devices or valves include base plates 48 and 49 having axially extending studs 50 and 51 respectively, studs 50 and 51 being axially bored at 52 and 53, and bores 52 and 53 open into chambers 38 and 39 through suitable ports 54 and 55 respectively. Plates 48 and 49 close ports 40 and 41 respectively. Tubular members 56 and 57 are mounted for reciprocation on studs 50 and 51 respectively and when in lowered position close ports 54 and 55. Members 56 and 57 are provided with caps 58 and 59 which are spaced from and provide an orifice of fixed area with respect to the walls of chambers 38 and 39 respectively. Springs 60 and 61 are mounted between caps 58 and 59 and base plates 48 and 49 respectively to urge tubular members 56 and 57 upwardly to open ports 54 and 55 and thus determine the pressure drop across the orifices of constant area provided between caps 58 and 59 and the walls of chambers 38 and 39 respectively.

These constant flow control devices or valves function in the manner described in my copending application above identified. For example, when hot water flows through nipple 36 and screen 42 it impinges upon cap 58 and the pressure forces cap 58 downwardly against the action of spring 60. Hot water flows through the orifice of constant area provided between cap 58 and the inner wall of chamber 38 and through port 54 into chamber 11. The volume delivered to chamber 11 depends upon the strength of spring 60 since spring 60 determines the pressure drop across the orifice of constant area. Should the pressure of the incoming hot water suddenly increase, cap 58 will be forced downwardly against the action of spring 60 partially closing port 54 and the volume of hot water delivered to chamber 11 will remain unchanged. If the pressure of the hot water decreases cap 58 will rise by the action of spring 60 enlarging the effective area of port 54 so that again a constant volume of hot water is delivered to chamber 11.

The constant flow control device or valve in cold water inlet 45 operates in the same manner as the constant flow control device or the valve in the hot water inlet.

A third constant flow control device or valve is positioned in chamber 15 and is of the same structure as described above with respect to the constant flow devices or valves in the hot and cold water inlets. The constant flow control valve in chamber 15 includes a base plate 62 provided with an upstanding stud 63 which is axially bored at 64 and is provided with a port 65. Tubular member 66 is mounted for reciprocation on stud 63 to control the effective area of port 65 and tubular member 66 is provided with a cap 67 which is a loose fit in chamber 15 to provide an orifice of constant area between its periphery and the walls of chamber 15. A spring 68 is mounted between base plate 62 and cap 67 and determines the constant volume of water passed by the valve and determines the pressure drop across the orifice of constant area provided between cap 67 and chamber 15. This valve operates in the same manner as described above with respect to the constant flow control device or valve in the hot water inlet. It should be noted that chamber 15 is so arranged and cap 67 is of such size that cap 67 will cooperate with shoulder 69 of port 13 to form a check valve to prevent cold water from passing from chamber 12 into chamber 11 when there is no hot water pressure in port 13.

The tensions of springs 60 and 61 determine the volumes of hot and cold water respectively admitted to housing 10 and, as an example as when the valve is for use with domestic automatic type washing machines, the tension of spring 60 should be so chosen as to pass approximately five gallons of hot water per minute while the tension of spring 61 should be so chosen as to pass approximately two and one half gallons of cold water per minute. The tension of spring 68 will determine the amount of hot water passing from chamber 11 into chamber 12 and the tension of this spring should be so chosen as to pass two and one half gallons of hot water per minute from chamber 11 into chamber 12 to give an equal mixture of hot and cold waters. By admitting equal volumes of hot water and cold water to chamber 12 and, with the temperatures of the hot and cold water remaining relatively constant, I have found that a constant volume of mixed water is admitted through orifice 21 into discharge port 16 at relatively constant temperature and the temperature of this mixed water varies less than it would in the usual thermostatically controlled mixing valve.

When the constant flow hot and cold water blending valve of the present invention is set up as above described, and is connected for use with a suitable domestic automatic washing machine requiring hot water and mixed waters during its cycle of operation, and coil 28 is energized, solenoid element 30 is withdrawn from bore 34 and valve element 32 opens port 19. A constant volume of hot water as determined by the constant flow device in chamber 38 then passes into chamber 11 and out through chamber 18 and port 19 to discharge port 16 and extension 17 into the washing machine. As the cycle of the washing machine progresses coil 28 is de-energized and solenoid element 30 closes bore 34 so that valve element 32 closes port 19 to stop the flow of hot water to the washing machine. Thereafter in the cycle of operation, coil 29 is energized withdrawing solenoid 31 to open bore 35 and valve element 33 is moved by differential pressure to open port 21. Hot water then flows past the constant flow control valve in chamber 15 and cold water flows past the constant flow control valve in chamber 39 so that predetermined volumes of hot and cold water are mixed in chamber 12 and pass outwardly through chamber 20 and port 21 into discharge port 16 and extension 17 to the washing machine. As noted above, the tensions of springs 60 and 61 predetermine the volumes of hot and cold water respectively admitted to chamber 12 and, with the temperatures of the hot and cold water remaining relatively constant, predetermine the temperature of the mixed water admitted to the washing machine.

The constant flow hot and cold water blending valve of the present invention can be preset to deliver the desired constant volume of hot water and the desired volume of mixed water, with the mixed water delivered at a predetermined constant temperature depending upon the temperatures available at the hot and cold water inlets, by the apropriate selection of the springs in the constant flow devices incorporated in the valve structure.

It will now be apparent that by the present invention I have provided a novel constant flow hot and cold water blending valve meeting all of the objectives described above.

Changes in or modification to the above described illustrative embodiment of my invention may now be suggested to those skilled in the art without departing from my inventive concept and reference should be had to the appended claims to determine the scope of my invention.

What is claimed is:

1. A mixing valve structure comprising a housing having hot and cold fluid inlet chambers adapted for communication with a common outlet from said housing, a pair of valve members operable between open and closed positions for controlling communication between said chambers respectively and said outlet, means for operating said valve members individually to open position for establishing flow of fluid between said chambers respectively and said outlet, said housing having a connecting passage between said chambers, means responsive to fluid pressure differential between said chambers for establishing flow of fluid from one of said chambers to said connecting passage for mixing with the fluid passing from the other of said chambers to said outlet, said fluid pressure differential responsive means including means for preventing flow of fluid through said passage from said other chamber to said one chamber.

2. A mixing valve structure as claimed in claim 1 wherein a pair of constant flow valve members is provided for automatically determining the rate of fluid flow to said inlet chambers respectively, said fluid pressure differential responsive means consisting of a third constant flow valve member for likewise controlling the rate of fluid flow from said one chamber to said connecting passage, said connecting passage having a valve seat formed on the wall of said passage and cooperable with said third valve member for limiting said flow to one direction through said passage.

3. A mixing valve structure as claimed in claim 2 wherein said pair of constant flow valve members have different rates of flow, said third constant flow valve member having a rate of flow substantially less than the rate of one of said pair.

4. A mixing valve structure as claimed in claim 3 wherein said pair of constant flow valve members control the flow of hot and cold water respectively with said hot water having the higher rate of flow, said third constant flow valve member controlling the flow of hot water to the cold water chamber at a rate substantially equal to that of said cold water control valve member.

References Cited in the file of this patent

UNITED STATES PATENTS

| Number | Name | Date |
| --- | --- | --- |
| 941,596 | White | Nov. 30, 1909 |
| 1,635,745 | Ellis | July 12, 1927 |
| 1,698,342 | McGill | Jan. 8, 1929 |
| 2,296,266 | Breckenridge | Sept. 22, 1942 |
| 2,321,573 | Chace | June 15, 1943 |
| 2,453,409 | Chace | Nov. 9, 1948 |
| 2,542,279 | Kempton | Feb. 20, 1951 |